Figure 1:
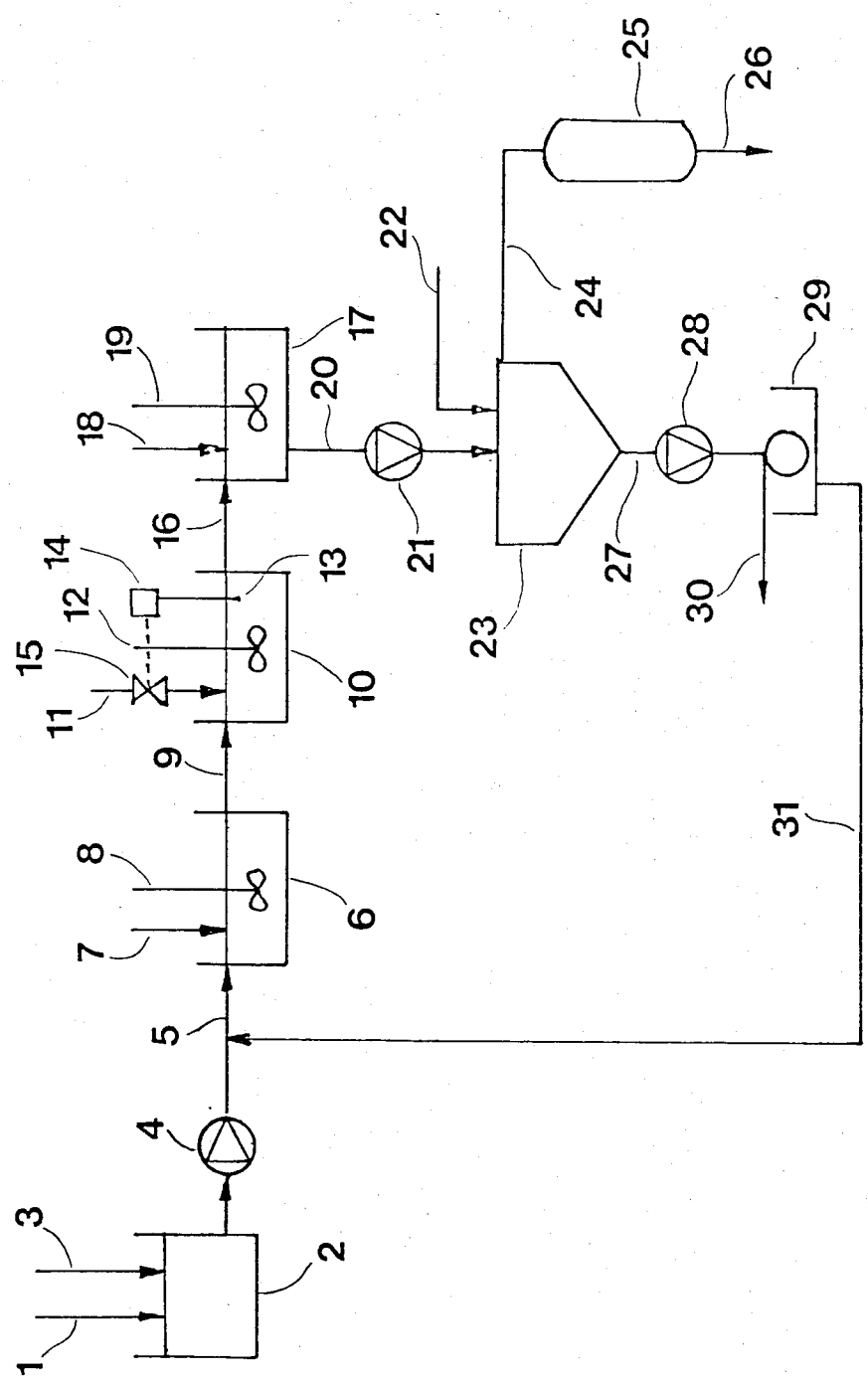

United States Patent [19]

Gadd et al.

[11] Patent Number: 4,503,017

[45] Date of Patent: Mar. 5, 1985

[54] METHOD OF PURIFYING WASTE AQUEOUS SOLUTIONS FROM HEAVY METALS

[75] Inventors: Rolf K. Gadd, Skelleftehamn, Sweden; Anna C. Sund-Hagelberg, Vaerløse, Denmark

[73] Assignee: Boliden Aktiebolag, Stockholm, Sweden

[21] Appl. No.: 558,552

[22] PCT Filed: Mar. 4, 1981

[86] PCT No.: PCT/SE81/00060

§ 371 Date: Oct. 1, 1981

§ 102(e) Date: Oct. 1, 1981

[87] PCT Pub. No.: WO81/02569

PCT Pub. Date: Sep. 17, 1981

Related U.S. Application Data

[63] Continuation of Ser. No. 308,549, Oct. 1, 1981, abandoned.

[30] Foreign Application Priority Data

Mar. 5, 1980 [SE] Sweden .............................. 8001720

[51] Int. Cl.³ ...................... C01G 9/00; C01G 11/02; C01G 19/00

[52] U.S. Cl. .......................................... 423/87; 423/1; 423/82; 423/92; 423/101; 210/723; 210/724; 210/726

[58] Field of Search ................ 423/1, 87, 92, 82, 101, 423/561 R, 561 B; 210/723, 724, 726

[56] References Cited

U.S. PATENT DOCUMENTS 3,421,850 11/1969 Peterson et al.
3,740,331 6/1971 Anderson et al. ................ 210/726

FOREIGN PATENT DOCUMENTS 4911810 10/1969 Japan ................................... 210/726

OTHER PUBLICATIONS

Larsen et al., "Two-Stage Process Chemically Treats Mine Drainage to Remove Dissolved Metals," E/M-J-Feb. 1976, pp. 94–96.

Skoog et al., *Fundamentals of Analytical Chemistry* Holt, Rinehart and Winston, Inc., 1963, pp. 746–748.

*Primary Examiner*—Curtis R. Davis
*Assistant Examiner*—Chung Pak
*Attorney, Agent, or Firm*—Stevens, Davis, Miller & Mosher

[57] ABSTRACT

A process for purifying an acid aqueous solution containing heavy metals by adding sulfide ions to said acid aqueous solution at a first pH lower than 3.4, precipitating a first heavy metal, adding sulfide ions again to said first precipitate containing acid aqueous solution, after adjusting to a pH of higher than 4, to precipitate a second heavy metal, and then removing the resultant first and second precipitates from the acid aqueous solution.

2 Claims, 1 Drawing Figure

METHOD OF PURIFYING WASTE AQUEOUS SOLUTIONS FROM HEAVY METALS

This application is a continuation of application Ser. No. 308,549, filed Oct. 1, 1981 abandoned.

The present invention relates to a method of purifying waste aqueous solutions containing heavy metals, such as zinc, arsenic, cadmium, antimony, lead, mercury and copper, of which at least one of the elements arsenic, antimony, mercury and tin is present in considerable amounts.

Waste solutions containing heavy metals are produced in many different kinds of activities, for example within the mining industry, the chemical-metallurgical industry and the surface-conditioning industry. Rainwater which has drained through heaped waste or has collected within an industrial area may also be contaminated. The term "heavy metals" here and below comprises certain elements such as selenium, arsenic and antimony which strictly speaking are not known as metals in chemical meaning, but which in environmental connection usually are considered as such.

Water which is contaminated with heavy metals is normally purified by adding lime to the water. The lime increases the pH, whereat metal hydroxides are precipitated. Water contaminated with heavy metals may also contain sulphate/sulphite ions originating from an addition of sulphuric acid in some process step or the other, or as a result of the absorption of sulphur dioxide or sulphur trioxide in the water. These sulphur compounds together with lime form gypsum or calcium sulphite. Normally, the lime must also be added in surplus quantities, because it contains an inactive part. Both of these factors mean that the sludge containing heavy metals are obtained when the lime precipitates contains components which do not contain heavy metals and which may often be of the same magnitude with regard to weight as the heavy metal hydroxides. This is a serious disadvantage, both with respect to storage and with respect to working-up said components.

Water containing heavy metals can also be purified by adding sodium hydroxide thereto, so as to form hydroxides. The disadvantages with sodium hydroxide however, is that it is not possible therewith to precipitate such ions as those occurring in solution in the form of negative form, for example arsenic and antimony, and that the metal hydroxide precipitate is difficult to separate from the water.

Proposals have also been made for precipitating heavy metals from mine water contaminated with said metals, with the aid of sulphide, as reported, inter alia, in an article by H. Peter Larsen and Laurence W. Ross (E/MJ-Feb. 1976 p 94-96). In this proposal, sodium hydroxide is added in a first stage to obtain a pH~5, whereafter sodium sulphide is added in a given quantity, to precipitate any heavy metals present, such as iron(III), copper, zinc and manganese. Such a sulphide precipitation method as that proposed for mine water, however, has an obvious disadvantage, since its applicability is limited and embraces generally those heavy metals aforementioned in connection with the purification of just mine water. In the case of industrial aqueous waste solutions of the type described in the introduction, it has been found that when applying said sulphide precipitation technique, no purification, or only poor purification, is obtained with respect to particularly high contents of such environmentally important elements as Hg, As, Sb, Sn, Pb, Bi, Cd and Cu. Thus, it has been found when practising the known sulphide precipitation method that if the content of, for example, As-(III) and/or Sb(III) is high (>100 mg/l), the hydroxide ions formed with the reaction of these elements with sulphide will increase the pH of the solution to such an extent that the ability of the aforementioned metal ions to react with sulphide is impaired or ceases totally. In this connection, the sulphide-ion content of the solution can readily increase to such an extent that previously precipitated sulphides are brought into solution by complex forming with surplus sulphide ions, for example in accordance with the following schematic reaction:

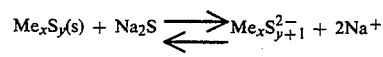

where Me is an element which can form sulphide precipitate in an acid pH but whose sulphide is soluble in sodium sulphide, and is a metal or a semi-metal.

Me designates, for example, arsenic, mercury, antimony or tin.

It has now surprisingly been found that it is possible, in the same process, to remove all those heavy metal ions which precipitate from solutions as sulphides, by modifying the previously known sulphide precipitation method. The method according to the invention is characterized in that the sulphide ions are charged to the solution at at least two separate acidity ranges, and that the acidity is adjusted between said ranges by adding a suitable base, whereafter the resultant precipitates are removed from the solution.

Thus, in the method according to the invention, the sulphide addition is carried out in at least two stages, whereat the pH at the first charge is adapted to the interval in which metal ions which react with sulphide ions in an acid solution are precipitated, whereafter prior to the second sulphide addition, the pH is raised by adding a suitable base, to a value at which metal ions which react with sodium sulphide in a weakly acid or neutral solution can be precipitated. In this respect, any base which does not contain sulphide ions can be used. Suitably bases in this connection are those which are readily dissolved or are in liquid form, for example hydroxides, carbonates or hydrocarbonates of alkali metals, preferably sodium or potassium, and oxides, hydroxides or carbonates of alkali earth metals, preferably calcium and magnesium, and also ammonia and ammonium hydroxide.

The pH value at the first sulphide ion charge is preferably below 3.4, and most preferably in the range 1.0-2.5. In this respect, the suitable pH at which the first sulphide ion addition is made is a question of optimation, since attention must be paid, on one hand, to the fact that a low pH, in the proximity of 1.0, results in highly extensive purification but, at the same time, with a high consumption of sulphide ions, while, on the other hand at a high pH the solubility of the heavy metals is greater. It will be understood, however, that the prime consideration is to those environmental requirements placed on specific heavy metals. By adding a base after the first sulphide-ion charge, the pH is preferably raised to at least 4, but preferably below 4.3. This pH range is limited downwardly by an excessively high metal-ion solubility, and is limited upwardly by incipient hydroxide precipitation. Thus, the precipitate formed in the first stage need not be separated separately, and hence once the solution has reached the aforementioned pH, additional sodium sulphide can be added direct, to precipitate remaining contaminating elements. The formed precipitate and the precipitate formed in subsequent precipitation stages are removed together. In the first stage elements which precipitate in acid solution are precipitated from the solution, for example such heavy metals as Hg(II), As(III), Sb(III), Sn(IV), Pb(II), Bi(III), Cd(II), and Cu(II) while in the second stage elements which precipitate in a weakly acid and neutral solution are precipitated from the solution, for example such heavy metals as Fe(II), Zn(II), Ni(II) and Co(II). By increasing the pH between the two sulphide precipitation stages, for example with hydroxide ions, a surplus of sulphide ions in the solution is avoided, therewith eliminating the risk of the formed sulphides re-dissolving, which enables the effective removal of high contents of elements present in the waste solution and belonging both to the first of the aforementioned heavy metal groups and those belonging to the last mentioned group.

As will be readily understood, when the aqueous solution prior to the first sulphide-ion charge has a pH which does not fall within the aforegiven pH range for said charge, said solution is brought to a pH within said range by supplying alkali or acid. When the aqueous solution contains high contents of such elements as those precipitated in the first stage, particularly high contents of arsenic, the pH of the solution should be set to a value in the proximity of the lower limit of said pH range prior to the first sulphide charge. Thus, complete arsenic precipitation at high arsenic contents is effected at the cost of the sulphide exchange, since the composition for the sulphide ions between the heavy metals and other substance present in the solution, such as sulphur dioxide, increases with a decreasing pH.

Seen generally, said precipitation is suitably carried out by feeding the water to be purified to a reaction vessel to which, optionally after adjusting the pH, sulphide ions are charged, to precipitate these ions which react with sulphide in an acid environment. The water, including the precipitate formed by the sulphide charge, is then passed to a second reaction vessel, to which hydroxide ions are charged in order to raise the pH to a desired level, for effecting the second sulphide precipitation stage, which is carried out in a third reaction vessel. The formed precipitates are then removed together in a thickener, and filtered on a conventional water-purifying filter. The addition of polyelectrolyte, accelerates the sedimentation in the thickener. The clear water obtained from the thickener can either be re-used, after being subjected to a fine filtering process, or can be further purified, for example by precipitating fluoride or sulphate by adding lime, or can be discharged to a recipient.

The invention will now be described in more detail with reference to the accompanying drawing, the single FIGURE of which illustrates a preferred plant for purifying acid industrial process water.

Contaminated process water is passed via a line 1 to an equalizing tank 2, to which alkali or acid 3 can be charged, to adjust the pH of the process water. The water is pumped from the tank 2 by means of a pump 4 through a line 5, to a reaction vessel 6. The reaction vessel 6 is provided with a stirring device 8 and a supply means 7 for sulphide ions. The sulphide ions may originate from any sulphide which readily dissolves in water, preferably sulphide of alkali metal or hydrogen sulphide. The process water and the precipitated material therein is passed, via a line 9, to a reaction vessel 10 which is provided with a stirring device 12 and a metering means 11 for hydroxide ions. The pH of the liquid in the reaction tank 10 is adjusted for the second sulphide precipitation stage, which is carried out in a reaction vessel 17. The water is passed from the vessel 10 to the vessel 17 via a line 16. The reaction vessel 71 is provided with a stirring device 19 and metering means 18 for sulphide ions.

The charge of sulphide ions, hydroxide ions or hydrogen ions to the reaction vessel 10 can be regulated, for example, by following the pH with a sensor 13 and controlling the valve 15 via control means 14.

The process water and the precipitated sludge therein is passed from the reaction vessel 17 to a sedimentation means 13 via line 20 and a pump 21. Means are provided for metering polyelectrolyte 22 to the sedimentation means 23. The clear-water phase from the sedimentation means 23 is passed to a fine-filter means 25 via a line 24, and for optional further treatment or re-use, via a line 26. Sludge separated in the sedimentation means 23 is pumped to a dewatering means 29 through a line 27 by means of a pump 28. The dewatered sludge 30 is then removed for recovering the metal content thereof, in, for example, a metallurgical process. The water phase 31 is returned to line 5.

EXAMPLE 1

To a process water purification plant of the kind illustrated in the FIGURE were charged 100 m³/h process water having the following analysed contents:

| | |
|---|---|
| Zn | 62.5 mg/l |
| As | 1312 mg/l |
| Cu | 11.3 mg/l |
| Pb | 5.1 mg/l |
| Cd | 4.3 mg/l |
| Se | 0.9 mg/l |
| Hg | 1.4 mg/l |
| Cl | 1350 mg/l |
| F | 89 mg/l |
| pH | 1.6 |

The pH of the water in the equalizing tank 2, which had a volumetric capacity of 150 m³, was adjusted to approximately 1.5 with the aid of sodium hydroxide. The process water was pumped to the reaction vessel 6, accommodating 55 m³, to which 2.3 grams of sodium sulphide per liter of water were added. The process was controlled by regulating the pH, which was raised to approximately 3 by adding sulphide.

The content of dissolved metals in the water in line 9 was then:

| | |
|---|---|
| Zn | 24.4 mg/l |
| As | <0.1 mg/l |
| Cu | <0.01 mg/l |
| Pb | 0.1 mg/l |
| Cd | <0.01 mg/l |
| Se | 0.4 mg/l |
| Hg | <0.01 mg/l |
| Cl | 1329 mg/l |
| F | 79 mg/l |

The overflow from the first reaction vessel 6 was passed to the second reaction vessel 10, which accommodated 50 m³, to which sodium hydroxide was added in order to increase the pH of the solution to approximately 4. The overflow from the second reaction vessel 10 was then passed to the third reaction vessel 17, accommodating 55 m³, to which 0.17 gram of $Na_2S$ per liter of solution was added. The process was controlled by regulating the pH, which then rose to approximately 4.6.

The contents of dissolved metal remained the same as that obtained when the pH was raised to approximately 3 by said sulphide addition, with the exception of zinc and arsenic. With a pH of 5, the zinc content was 1.4 mg/l, and the arsenic content 1.3 mg/l, i.e. the zinc content was considerably reduced as a result of the second sulphide addition.

It is obvious from the somewhat increased arsenic content of the water solution subsequent to the second sodium sulphide addition, that the region in which arsenic sulphide is dissolved had again been reached in the example, i.e. a region in which a surplus of sulphide ions exists. Thus, the pH of the solution must be regulated in both precipitation stages so that re-dissolution is avoided to the greatest possible extent, without impairing the precipitation yield for those metals which precipitate in a weakly acid or neutral solution.

EXAMPLE 2

By way of comparison a test was carried out in the same process-water purification plant as that used in Example 1, but with the difference that all of the sulphide was charged in one step to the third reaction vessel 17, that is to say the charge was made in accordance with previously known sulphide precipitation methods. The process water used in this test had the following analysed contents:

| | |
|---|---|
| Cu | 3.0 mg/l |
| Zn | 234 mg/l |
| Pb | 40.8 mg/l |
| Cd | 3.4 mg/l |
| Bi | 3.0 mg/l |
| Sb | 1.5 mg/l |
| As | 622 mg/l |
| Se | 3.3 mg/l |
| Hg | 18.4 mg/l |
| F | 383 mg/l |
| Cl | 1190 mg/l |
| $SO_3^{2-}$, $SO_2$ | 710 mg/l |
| $SO_4^{2-}$ | 1600 mg/l | and its pH was ~3.0.

The water was passed to the reaction vessel 17 via the first two reaction vessels 6, 10. No chemicals were added to the water in the first two tanks. All sodium sulphide (1.2 g) was charged to the reaction vessel 17. The process was controlled by regulating the pH to approximately 5.8.

The contents of metals dissolved in the water subsequent to removing the sludge precipitate were:

| | |
|---|---|
| Cu | <0.01 mg/l |
| Zn | 0.28 mg/l |
| Pb | 0.08 mg/l |
| Cd | 0.02 mg/l |
| Bi | 0.08 mg/l |
| Sb | 0.75 mg/l |
| As | 306 mg/l |
| Se | 0.2 mg/l |
| Hg | <0.01 mg/l | i.e. arsenic precipitation in this single stage method was unsatisfactory.

EXAMPLE 3

100 m³ of water having the following contaminant contents were charged each hour to the process-purification plant according to Example 1.

| | |
|---|---|
| Zn | 42 mg/l |
| As | 131 mg/l |

Cd, Bi, Sb, Se and Hg each < 10 mg/l. The pH of the water was ~1.95.

To the first reaction vessel 6 there was charged 0.6 g $Na_2S$ whereat the pH rose to approximately 3.0. The water was then passed to the reaction vessel 10 where the pH was adjusted to approximately 4.0 by adding 0.16 g NaOH, whereafter the water was passed to the reaction vessel 17, to which 0.1 g $Na_2S$ was added, thereby to raise the pH of solution to approximately 5.1.

An analysis of the clear water from the line 24 showed that the contents of dissolved metals in the water had been reduced hereby to:

| | |
|---|---|
| Zn | 0.5 mg/l |
| As | 0.7 mg/l |
| Cd, Bi and Hg | 0.1 mg/l |
| Sb and Se | 0.5 mg/l |

We claim:

1. A method for purifying an acid aqueous solution containing heavy metals of which at least one of the elements arsenic, antimony, mercury and tin is present in considerable amounts and of which at least one of the elements iron, zinc, nickel and cobalt also is present, by chemical precipitation with sulphide ions, comprising charging sulphide ions to the solution at a first pH lower than 3.4, precipitating a first heavy metal precipitate, adjusting the acidity upwardly to a second pH of approximately 4 by adding a base containing no sulphide ions, adding sulphide ions to said precipitate containing solution, to precipitate any metal present belonging to the group consisting of iron, zinc, nickel and cobalt as a second precipitate and thereafter removing the resultant first and second precipitates from the solution.

2. The method according to claim 1 wherein said first pH is between 1.0–2.5, and the second is higher than 4 but lower than 4.3.

* * * * *